United States Patent
Dunham et al.

(10) Patent No.: US 9,804,905 B1
(45) Date of Patent: Oct. 31, 2017

(54) SYSTEM, METHOD, AND COMPUTER PROGRAM FOR COMMUNICATING BETWEEN A SOFTWARE DRIVER AND A BASEBOARD MANAGEMENT CONTROLLER

(71) Applicant: Lenovo Enterprise Solutions (Singapore) Pte. Ltd., Singapore (SG)

(72) Inventors: Scott Neil Dunham, Apex, NC (US); Sumeet Kochar, Cary, NC (US)

(73) Assignee: LENOVO ENTERPRISE SOLUTIONS (SINGAPORE) PTE. LTD., Singapore (SG)

( * ) Notice: Subject to any disclaimer, the term of this patent is extended or adjusted under 35 U.S.C. 154(b) by 0 days.

(21) Appl. No.: 15/247,761

(22) Filed: Aug. 25, 2016

(51) Int. Cl.
- *G06F 3/00* (2006.01)
- *G06F 9/44* (2006.01)
- *G06F 9/46* (2006.01)
- *G06F 13/00* (2006.01)
- *G06F 9/54* (2006.01)

(52) U.S. Cl.
CPC ............................ *G06F 9/544* (2013.01)

(58) Field of Classification Search
None
See application file for complete search history.

(56) References Cited

U.S. PATENT DOCUMENTS

| | | | |
|---|---|---|---|
| 7,007,160 B1* | 2/2006 | Makphaibulchoke | G06F 9/4411 713/1 |
| 7,426,728 B2* | 9/2008 | Ruemmler | G06F 9/30101 710/260 |
| 2013/0138934 A1* | 5/2013 | Lin | G06F 9/4411 713/1 |
| 2014/0207991 A1* | 7/2014 | Kaushik | G06F 13/4269 710/308 |
| 2015/0331694 A1* | 11/2015 | Balakrishnan | G06F 9/4408 713/2 |
| 2016/0364243 A1* | 12/2016 | Puthillathe | G06F 9/4411 |

* cited by examiner

*Primary Examiner* — Tuan Dao
*Assistant Examiner* — William C Wood
(74) *Attorney, Agent, or Firm* — Zilka-Kotab, P.C.

(57) ABSTRACT

According to one embodiment, a computer program embodied on a tangible computer readable medium includes computer code for obtaining baseboard management controller (BMC) access details, computer code for establishing a communication mechanism between a software driver and the BMC, utilizing the BMC access details, and computer code for sending a request between the software driver and the BMC, utilizing the communication mechanism.

20 Claims, 4 Drawing Sheets

SYSTEM, METHOD, AND COMPUTER PROGRAM FOR COMMUNICATING BETWEEN A SOFTWARE DRIVER AND A BASEBOARD MANAGEMENT CONTROLLER

FIELD OF THE INVENTION

The present invention relates to system data communication, and more particularly to enabling efficient communication between system components.

BACKGROUND

Some software based drivers may desire to report systems management information to higher level systems management software as well as perform their intended task. The reporting of this information (such as status and alerts) may be accomplished using in-band OS based methods. However, the use of Out of Band (OOB) methods to accomplish these systems management actions is highly desired for at least efficiency and security reasons.

SUMMARY

According to one embodiment, a computer program embodied on a tangible computer readable medium includes computer code for obtaining baseboard management controller (BMC) access details, computer code for establishing a communication mechanism between a software driver and the BMC, utilizing the BMC access details, and computer code for sending a request between the software driver and the BMC, utilizing the communication mechanism.

A method according to another embodiment includes obtaining baseboard management controller (BMC) access details, establishing a communication mechanism between a software driver and the BMC, utilizing the BMC access details, and sending a request between the software driver and the BMC, utilizing the communication mechanism.

A system according to another embodiment includes a processor for obtaining baseboard management controller (BMC) access details, establishing a communication mechanism between a software driver and the BMC, utilizing the BMC access details, and sending a request between the software driver and the BMC, including placing communication protocol contents into a memory map input/output (MMIO) window area shared by the BMC and the software driver, interrupting the BMC or the software driver, and transferring the request between the software driver and the BMC using the communication protocol contents from the MMIO window area shared by the BMC and the software driver.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

Figure 1:
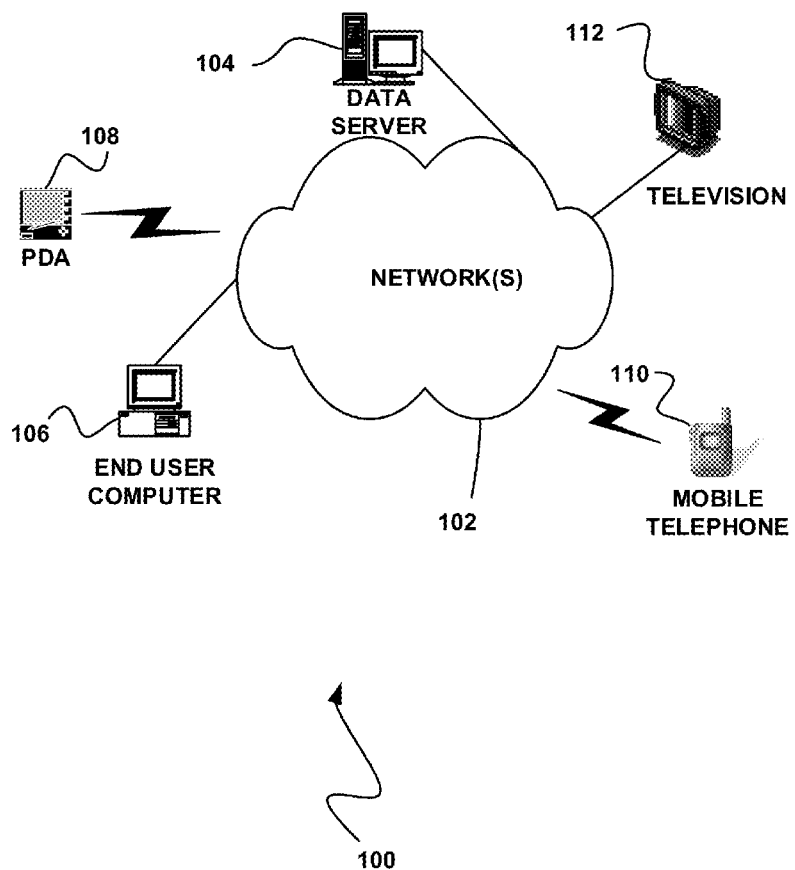
FIG. 1 illustrates a network architecture, in accordance with one possible embodiment.

FIG. 1 illustrates a network architecture 100, in accordance with one possible embodiment. As shown, at least one network 102 is provided. In the context of the present network architecture 100, the network 102 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 102 may be provided.

Coupled to the network 102 is a plurality of devices. For example, a server computer 104 and an end user computer 106 may be coupled to the network 102 for communication purposes. Such end user computer 106 may include a desktop computer, lap-top computer, and/or any other type of logic. Still yet, various other devices may be coupled to the network 102 including a personal digital assistant (PDA) device 108, a mobile phone device 110, a television 112, etc.

Figure 2:
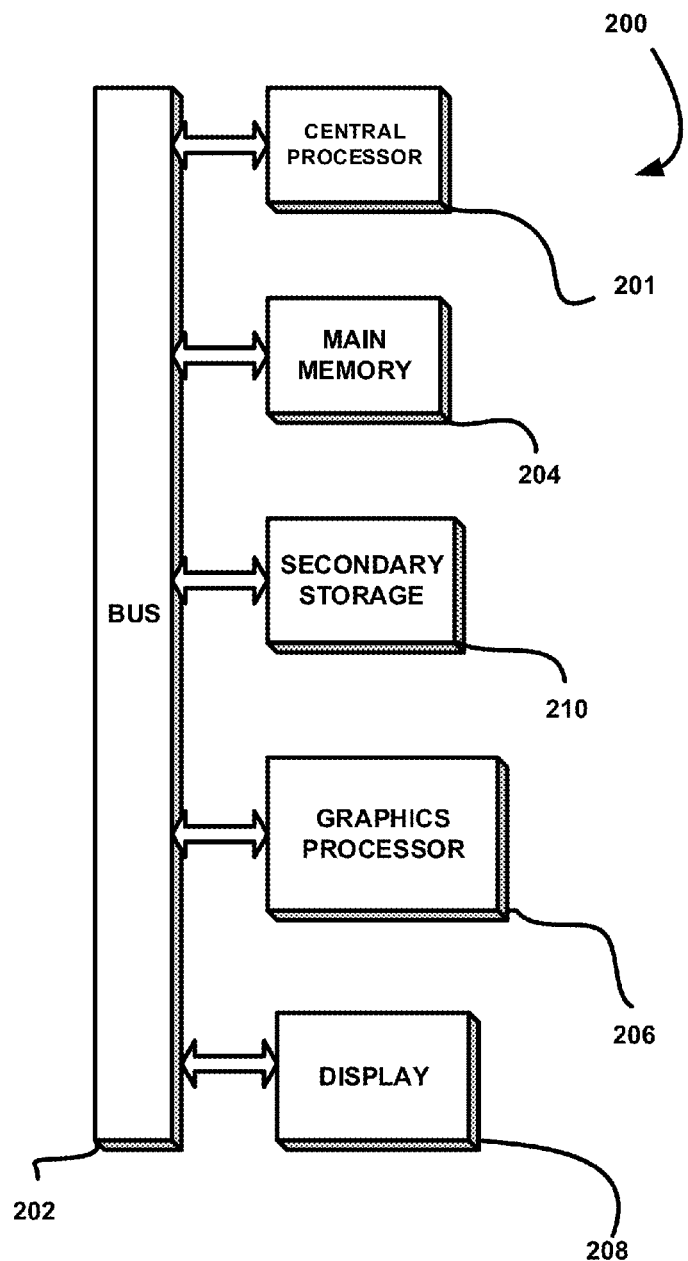
FIG. 2 illustrates an exemplary system, in accordance with one embodiment.

FIG. 2 illustrates an exemplary system 200, in accordance with one embodiment. As an option, the system 200 may be implemented in the context of any of the devices of the network architecture 100 of FIG. 1. Of course, the system 200 may be implemented in any desired environment.

As shown, a system 200 is provided including at least one central processor 201 which is connected to a communication bus 202. The system 200 also includes main memory 204 [e.g. random access memory (RAM), etc.]. The system 200 also includes a graphics processor 206 and a display 208.

The system 200 may also include a secondary storage 210. The secondary storage 210 includes, for example, a hard disk drive and/or a removable storage drive, representing a floppy disk drive, a magnetic tape drive, a compact disk drive, etc. The removable storage drive reads from and/or writes to a removable storage unit in a well-known manner.

Computer programs, or computer control logic algorithms, may be stored in the main memory 204, the secondary storage 210, and/or any other memory, for that matter. Such computer programs, when executed, enable the system 200 to perform various functions (to be set forth below, for example). Memory 204, storage 210, volatile or non-volatile storage, and/or any other type of storage are possible examples of non-transitory computer-readable media.

Figure 3:
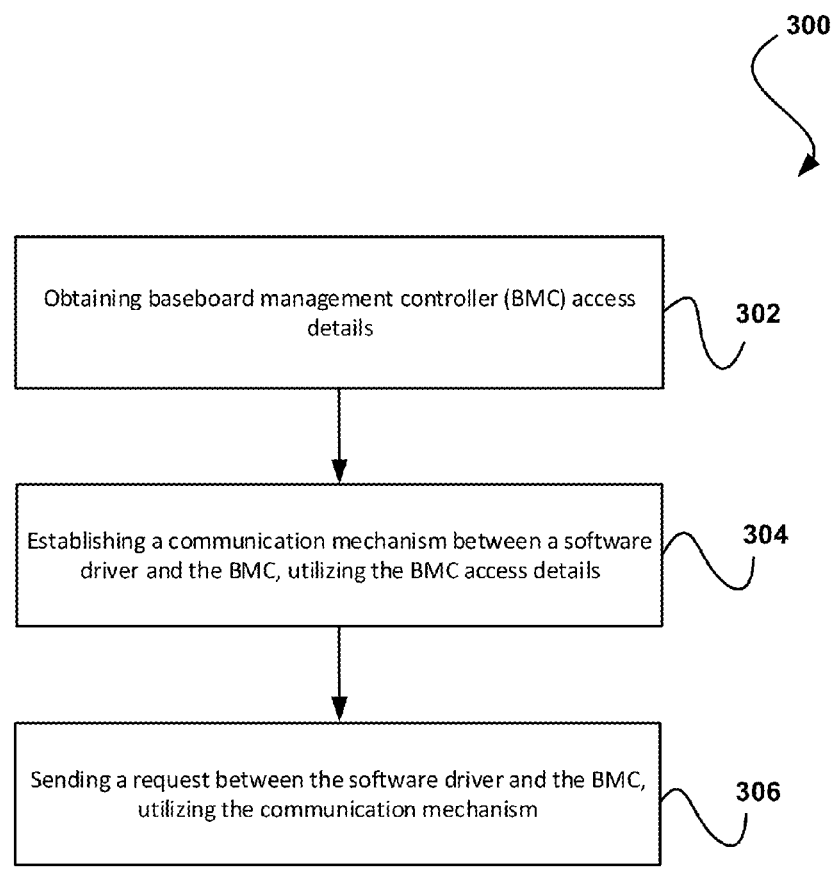
FIG. 3 illustrates a method for communicating between a software driver and a baseboard management controller, in accordance with one embodiment.

FIG. 3 illustrates a method 300 for communicating between a software driver and a baseboard management controller, in accordance with one embodiment. As an option, the method 300 may be carried out in the context of the details of FIGS. 1-2 and 4. Of course, however, the method 300 may be carried out in any desired environment. Further, the aforementioned definitions may equally apply to the description below.

As shown in operation 302, baseboard management controller (BMC) access details are obtained. In one embodiment, the BMC access details may be obtained by a software driver. For example, the software driver may include a computer program that provides a software interface to one or more elements of an associated system. In another example, the software driver may enable access to one or more elements of a computing device.

Additionally, in one embodiment, the software driver may not be directly attached to its own hardware element within a system. In another embodiment, the software driver may include a pseudo-hardware driver. For example, the software driver may report one or more of systems management information, inventory information, status, alerts, etc. to the BMC which can then be accessed by the remote high level software. In another example, the software driver may receive information from the remote high level software via communication with the BMC (e.g., configuration information such as a hardware configuration, etc.).

Further, in one embodiment, the BMC may include a secondary controller within a system. For example, the BMC may include a secondary controller separate from a central processing unit (CPU) within the system. In another example, the BMC may include a specialized service processor that monitors a physical status of a hardware device (e.g., the system, etc.). In yet another example, the BMC may utilize one or more sensors within the hardware (e.g., temperature sensors, voltage readings, etc.).

Further still, in one embodiment, the BMC access details may be obtained by a unified extensible firmware interface (UEFI) during system initialization. In another embodiment, the UEFI may write the BMC access details to an original equipment manufacturer (OEM) advanced configuration and power interface (ACPI) table. For example, the OEM ACPI table may be created by the UEFI during system initialization but prior to an operating system (OS) booting. In another embodiment, the BMC access details may include a plurality of access information. For example, the BMC access details may include one or more of PCI-IRQ (PIRQ) interrupt information, memory map input/output (MMIO) window details, BMC hardware device information, etc.

Also, in one embodiment, the software driver may obtain the BMC access details from the OEM ACPI table. For example, the software driver may obtain the BMC access details from the OEM ACPI table when the software driver is loaded.

Additionally, as shown in operation 304, a communication mechanism between a software driver and the BMC is established, utilizing the BMC access details. In one embodiment, establishing the communication mechanism may include utilizing the BMC access details by the software driver to enable communication with the BMC. For example, utilizing the BMC access details, the software driver may obtain access to an MMIO window of the BMC, such that the MMIO window may be shared by both the BMC and the software driver. In another example, utilizing the BMC access details, the software driver may hook a PIRQ interrupt within the system (e.g., within a field programmable gate array (FPGA) of the system, etc.), such that the PIRQ interrupt may be utilized to notify the software driver of a request from the BMC.

Furthermore, in one embodiment, the communication mechanism may include a means by which the software driver communicates to the BMC, and a means by which the BMC communicates to the software driver. In another embodiment, the BMC access details may describe the communication path between the software driver and the BMC. In this way, the software driver may utilize the BMC access details to describe the BMC to the OS so that the software driver can claim ownership of the BMC and load properly.

Further still, as shown in operation 306, a request is sent between the software driver and the BMC, utilizing the communication mechanism. In one embodiment, the request may include a systems management request. In another embodiment, the request may be initiated by the BMC. For example, the BMC may place communication protocol contents into an MMIO window area shared with the software driver. In another example, the BMC may interrupt the software driver by triggering an appropriate PIRQ. In yet another example, the BMC may transfer request and response data to the software driver using the communication protocol contents from the shared MMIO window area.

Also, in one embodiment, the request may be initiated by the software driver. For example, the software driver may place communication protocol contents into the MMIO window area shared with the BMC. In another example, the software driver may interrupt the BMC, utilizing a doorbell bit. In yet another example, the software driver may transfer request and response data to the BMC using the communication protocol contents from the shared MMIO window area.

In this way, the software driver may communicate directly with the BMC. This may eliminate a need for a device driver for the BMC. Remote systems management software may communicate OOB with the BMC to indirectly interact with the software driver. Additionally, less management utility development may be necessary, since there is no systems management software interaction with the host operating system. Further, security risks associated with host operating system interaction may also be avoided.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 4:
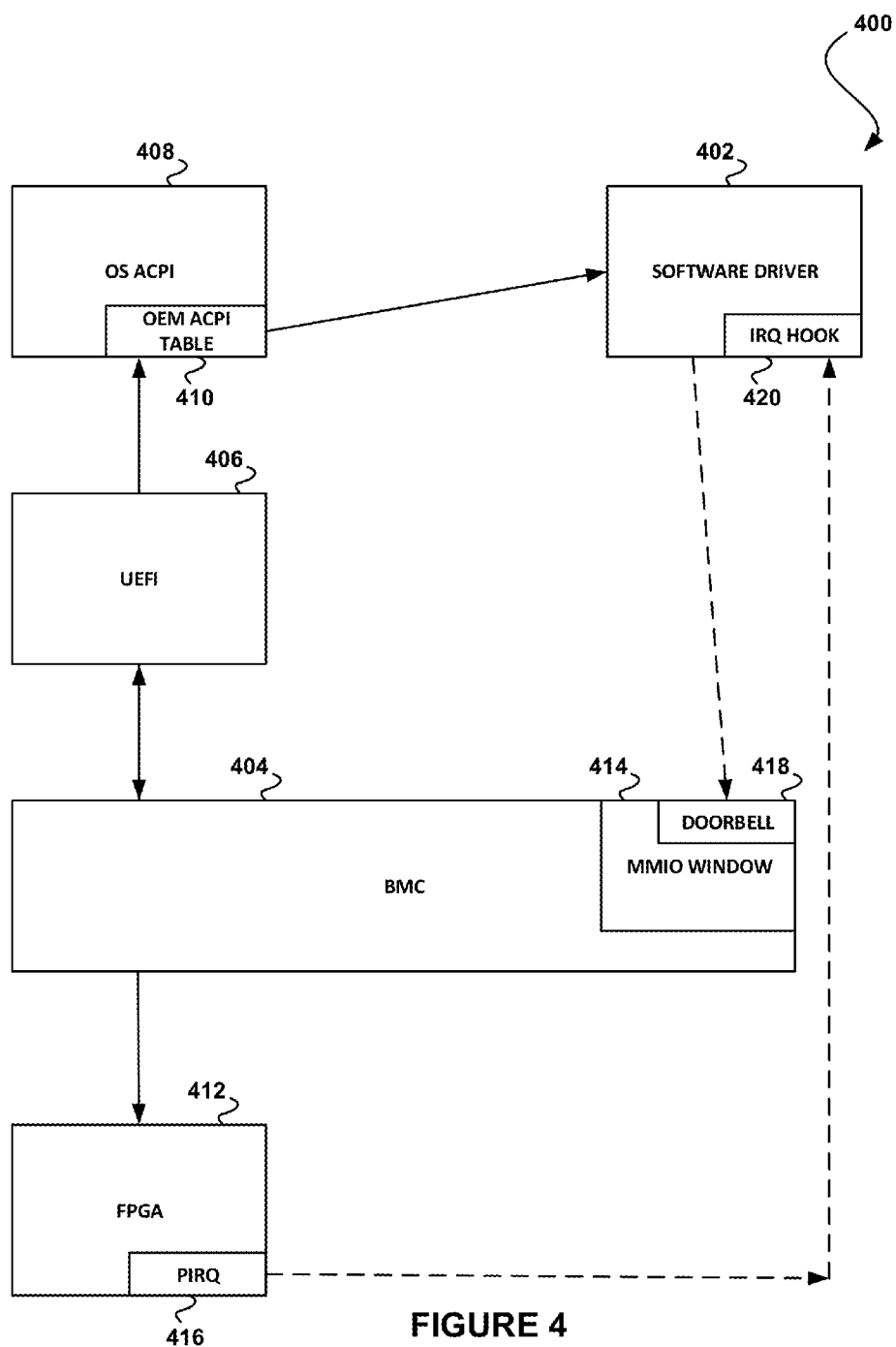
FIG. 4 illustrates an exemplary system enabling communication between a software driver and a baseboard management controller, in accordance with one embodiment.

FIG. 4 illustrates an exemplary system 400 enabling communication between a software driver 402 and a baseboard management controller (BMC) 404, according to one embodiment. As shown in FIG. 4, the system 400 includes a unified extensible firmware interface (UEFI) 406 as well as an operating system (OS) advanced configuration and power interface (ACPI) table 408 that includes an original equipment manufacturer (OEM) advanced configuration and power interface (ACPI) table 410.

In one embodiment, during an initialization of the system 400, and prior to booting the OS, the UEFI 406 may obtain access details to the BMC 404. In one embodiment, the access details to the BMC 404 may include information necessary to communicate with the BMC 404. Table 1 illustrates exemplary access details, in accordance with one embodiment. Of course, it should be noted that the access details shown in Table 1 are set forth for illustrative purposes only, and thus should not be construed as limiting in any manner.

TABLE 1

| PIRQ used |
|---|
| This may indicate which sharable PIRQ (A, B, C, or D) will be triggered by the BMC to interrupt the software driver 402 when |

TABLE 1-continued initiating a system's management task. This PIRQ may be hooked by the software driver 402. The BMC 404 may have PIRQ 416 capability, which may be provided by a field programmable gate array (FPGA) 412.

MMIO window details

This may show the MMIO address range of the MMIO window 414 used for information transfer between the software driver 402 and the BMC 404. This may include a dual ported memory window accessible from the host memory address space by the software driver 402 or from the BMC memory address space by the BMC 404. It will also indicate which bit is to be used as a doorbell bit 418 to interrupt the BMC 404 for software driver 402 initiated systems management tasks. Additional, more granular window subfields may be described based on the communication protocol to be used between the software driver 402 and the BMC 404 (e.g. semaphore bits, input fields, return data fields, etc.).

BMC hardware device information

This may be used to describe PCI function details (e.g., address, PCI IDs, etc.) of the BMC 404 function that contains the MMIO window 414. This may be needed in order for the software driver 402 to claim ownership of the MMIO window 402 and PIRO 416.

Additionally, in one embodiment, the UEFI 406 may then write the BMC 404 access details to the OEM ACPI table 410. In another embodiment, the software driver 402 may then be loaded and may obtain the BMC 404 access details from the OEM ACPI table 410. In yet another embodiment, the software driver 402 may then obtain access to the MMIO window 414 and may hook the PIRQ 416, using the BMC 404 access details obtained from the OEM ACPI table 410.

In this way, during software driver 402 initialization, the software driver 402 may learn the details of the communication path between the software driver 402 and the BMC 404. The asynchronous interrupts may be used rather than polling methods to improve performance. The software driver 402 may access the OEM ACPI table 410 that contains the necessary communication information. This table may be created by UEFI 406 during system initialization prior to OS boot. The UEFI 406 may interact with the BMC 404 to obtain the necessary information to populate the table.

Further, in one embodiment, the BMC 404 may initiate communication with the software driver 402. For example, the BMC 404 may set up the MMIO window 414 according to the established communication protocol (e.g., the communication protocol detailed in the BMC 404 access details, etc.). For instance, the BMC 404 may use MMIO window 414 details listed in the OEM ACPI table 410. The BMC 404 may also place communication protocol contents (e.g., a systems management request, etc.) into the shared MMIO window 414.

Further still, in another example, the BMC 404 may request to assert the PIRQ 416 at the FPGA 412. For instance, the BMC 404 may use PIRQ 416 information listed in the OEM ACPI table 410. Also, the FPGA 412 may include an integrated circuit that is configured using a hardware description language. In yet another example, the FPGA 412 may then assert the PIRQ 416 in order to interrupt the software driver 402 (e.g., via an IRQ hook 420 at the software driver 402, etc.). In still another example, the software driver 402 may then access the shared MMIO window 414 to obtain the communication protocol contents (e.g., the systems management request, etc.).

In this way, the software driver 402 may receive communication interrupts from the BMC 404 since the software driver 402 may hook the PIRQ 416 indicated in the OEM ACPI table 410. The BMC 404 may trigger the PIRQ 416 after placing the communication protocol contents into the shared MMIO window 414. The pre-defined communication protocol using the MMIO window 414 may then be used to transfer the actual request and the response data.

Also, in one embodiment, further interaction between the BMC 404 and the software driver 402 may be performed utilizing the established communication protocol. In another embodiment, the software driver 402 may include a redundant array of independent disks (RAID) driver that implements software controlled RAID across several disks. The BMC 404 request may then include a request to obtain a current RAID configuration, volume capacities, etc. In another embodiment, the BMC 404 may alert OS applications of environmental events monitored by the BMC 404. For example, the BMC 404 may send an environmental alert condition to the software driver 402, and one or more OS applications may then access the alert condition via the software driver 402 (e.g., as part of a subscription service, etc.).

Additionally, in one embodiment, the software driver 402 may initiate communication with the BMC 404. For example, the software driver 402 may set up the MMIO window 414 according to the established communication protocol (e.g., the communication protocol detailed in the BMC 404 access details, etc.). For instance, the software driver 402 may use MMIO window 414 details obtained listed in the OEM ACPI table 410. The software driver 402 may also place communication protocol contents (e.g., a systems management request, etc.) into the shared MMIO window 414.

Further still, in another example, the software driver 402 may set a doorbell bit 418 of the MMIO window 414. This updated doorbell bit 418 may cause an interrupt to the BMC 404 in its environment. In yet another example, the BMC 404 may then access the MMIO window 414 to obtain the communication protocol contents (e.g., the systems management request, etc.).

In this way, the software driver 402 may set up the necessary data in the shared MMIO window 414 and may then set the doorbell bit 418 to interrupt the BMC 404 in its environment. The BMC 404 may then use the pre-defined communication protocol of the shared MMIO window 414 to handle the request and return any response data.

Also, in one embodiment, further interaction between the BMC 404 and the software driver 402 may be performed utilizing the established communication protocol. For example, the BMC 404 may also use the communication protocol in the MMIO window 414 to handle the request and return any response data. In another embodiment, if the software driver 402 includes a RAID driver, the software driver 402 may send an alert (e.g., a configuration update, etc.) to the BMC 404.

In this way, by using out of band (OOB) methods, a remote system's management utilities may become aware of status and alerts without the need to interface in-band to the OS. Additionally, less development may be required since only the OOB interaction with the BMC 404 may be required as opposed to a different interaction to support each host OS. Further, a mechanism may be provided for the software driver 402 to interact with the BMC 404 without the need for a BMC 404 device driver.

It will be clear that the various features of the foregoing systems and/or methodologies may be combined in any way, creating a plurality of combinations from the descriptions presented above.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer program embodied on a non-transitory computer readable medium, comprising:
    computer code for obtaining, by a software driver, baseboard management controller (BMC) access details from an original equipment manufacturer (OEM) advanced configuration and power interface (ACPI) table, the BMC access details including PCI-IRQ (PIRQ) interrupt information and memory map input/output (MMIO) window details;
    computer code for establishing, by the software driver, a communication mechanism between the software driver and the BMC, utilizing the BMC access details; and
    computer code for sending a request from the software driver to the BMC, utilizing the communication mechanism.

2. The computer program of claim 1, further comprising computer code for receiving, by the software driver, a second request initiated by the BMC, where:
    the software driver identifies a PIRQ interrupt triggered by the BMC; and
    the software driver receives the second request by retrieving communication protocol contents placed in the MMIO window by the BMC.

3. The computer program of claim 1, wherein sending the request from the software driver to the BMC includes:
    placing, by the software driver, communication protocol contents into the MMIO window of the BMC,
    interrupting, by the software driver, the BMC, utilizing a doorbell bit, and
    transferring, by the software driver, request or response data to the BMC using the communication protocol contents from the MMIO window of the BMC.

4. The computer program of claim 1, wherein establishing, by the software driver, the communication mechanism between the software driver and the BMC, utilizing the BMC access details, includes:
    obtaining access by the software driver to the MMIO window of the BMC, such that the MMIO window is shared by both the BMC and the software driver, and
    hooking a PIRQ interrupt within a field programmable gate array (FPGA), such that the PIRQ interrupt is utilized to notify the software driver of a request from the BMC.

5. The computer program of claim 1, wherein, utilizing the BMC access details, the software driver obtains access to the memory map input/output (MMIO) window of the BMC, such that the MMIO window is shared by both the BMC and the software driver.

6. The computer program of claim 1, wherein, utilizing the BMC access details, the software driver hooks the PCI-IRQ (PIRQ) interrupt, such that the PIRQ interrupt is utilized to notify the software driver of a request from the BMC.

7. The computer program of claim 1, wherein the BMC access details are obtained by a unified extensible firmware interface (UEFI) during an initialization of a system.

8. The computer program of claim 7, wherein the UEFI writes the BMC access details to the original equipment manufacturer (OEM) advanced configuration and power interface (ACPI) table.

9. The computer program of claim 8, wherein the software driver obtains the BMC access details from the OEM ACPI table when the software driver is loaded.

10. A method, comprising:
    obtaining, by a software driver, baseboard management controller (BMC) access details from an original equipment manufacturer (OEM) advanced configuration and power interface (ACPI) table, the BMC access details including PCI-IRQ (PIRQ) interrupt information and memory map input/output (MMIO) window details;
    establishing, by the software driver, a communication mechanism between the software driver and the BMC, utilizing the BMC access details; and
    sending a request from the software driver to the BMC, utilizing the communication mechanism.

11. The method of claim 10, further comprising receiving, by the software driver, a second request initiated by the BMC, where:
    the software driver identifies a PIRQ interrupt triggered by the BMC; and
    the software driver receives the second request by retrieving communication protocol contents placed in the MMIO window by the BMC.

12. The method of claim 10, wherein sending the request from the software driver to the BMC includes
    placing, by the software driver, communication protocol contents into the MMIO window of the BMC,
    interrupting, by the software driver, the BMC, utilizing a doorbell bit, and
    transferring, by the software driver, request or response data to the BMC using the communication protocol contents from the MMIO window of the BMC.

13. The method of claim 10, wherein establishing, by the software driver, the communication mechanism between the software driver and the BMC, utilizing the BMC access details, includes:
    obtaining access by the software driver to the MMIO window of the BMC, such that the MMIO window is shared by both the BMC and the software driver, and
    hooking a PIRQ interrupt within a field programmable gate array (FPGA), such that the PIRQ interrupt is utilized to notify the software driver of a request from the BMC.

14. The method of claim 10, wherein, utilizing the BMC access details, the software driver obtains access to the memory map input/output (MMIO) window of the BMC, such that the MMIO window is shared by both the BMC and the software driver.

15. The method of claim 10, wherein, utilizing the BMC access details, the software driver hooks the PCI-IRQ (PIRQ) interrupt, such that the PIRQ interrupt is utilized to notify the software driver of a request from the BMC.

16. The method of claim 10, wherein the BMC access details are obtained by a unified extensible firmware interface (UEFI) during an initialization of a system.

17. The method of claim 16, wherein the UEFI writes the BMC access details to the original equipment manufacturer (OEM) advanced configuration and power interface (ACPI) table.

18. The method of claim 17, wherein the software driver obtains the BMC access details from the OEM ACPI table when the software driver is loaded.

19. A system, comprising:
    a processor for:
        obtaining, by a software driver, baseboard management controller (BMC) access details from an original equipment manufacturer (OEM) advanced configuration and power interface (ACPI) table, the BMC access details including PCI-IRQ (PIRQ) interrupt information and memory map input/output (MMIO) window details;

establishing, by the software driver, a communication mechanism between the software driver and the BMC, utilizing the BMC access details; and sending a request from the software driver to the BMC, including:
- placing communication protocol contents into a memory map input/output (MMIO) window area shared by the BMC and the software driver,
- interrupting the BMC, and
- transferring the request between the software driver and the BMC using the communication protocol contents from the MMIO window area shared by the BMC and the software driver.

20. The system of claim 19, wherein the processor is coupled to memory via a bus.

\* \* \* \* \*